U. G. BAKER.
BENDING ROLL FOR SHEET GLASS APPARATUS.
APPLICATION FILED MAR. 16, 1918.
1,273,310.
Patented July 23, 1918.
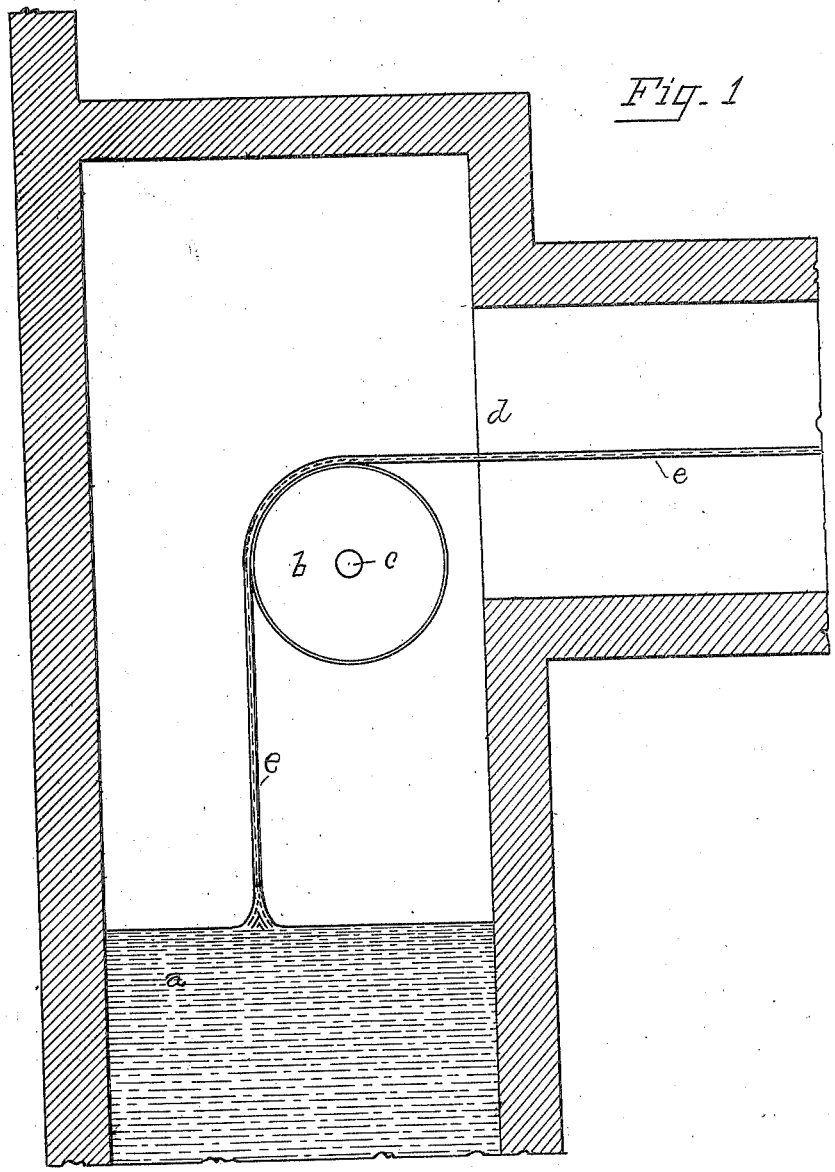

UNITED STATES PATENT OFFICE.

ULYSSES G. BAKER, OF INDIANAPOLIS, INDIANA.

BENDING-ROLL FOR SHEET-GLASS APPARATUS.

1,273,310.

Specification of Letters Patent.  Patented July 23, 1918.

Application filed March 16, 1918.  Serial No. 222,823.

*To all whom it may concern:*

Be it known that I, ULYSSES G. BAKER, a citizen of the United States, residing at Indianapolis, in the county of Marion and State of Indiana, have invented certain new and useful Improvements in Bending-Rolls for Sheet-Glass Apparatus; and I do declare the following to be a full, clear, and exact description of the invention, such as will enable others skilled in the art to which it appertains to make and use the same, reference being had to the accompanying drawings and to the letters of reference marked thereon, which form a part of this specification.

My invention relates to an apparatus for continuously drawing sheet glass, in which apparatus a "bait" of suitable width for the sheet of glass to be produced is suspended and dropped into a drawing tank of molten glass and is then drawn out of the tank followed by an adhering sheet of glass which is drawn upwardly over a bending roll and then onwardly into and through an annealing leer. A serious difficulty encountered in this character of apparatus, heretofore in use, is that by reason of the hot soft surface of the glass coming in contact with the bending roll such surface and its natural fire-finish are abraded and otherwise marred. The soft sheet of glass passing over the bending roll tends to adhere to the roll and rapidly takes impressions of any irregularities in the surface of the roll, and when the surface of the roll is of iron or steel, as well as certain other substances, the surface of the glass frequently becomes "burned", crystallized, or clouded, or opaque in spots, so that the production of a continuous sheet of glass free from blemish is, by reason of the defective character of the bending roll, rendered nearly impossible.

My invention relates, more particularly, to the bending roll and is designed to provide a bending roll having a surface which shall be free from the objections and difficulties above indicated.

In the single figure of the accompanying drawing is indicated the sort of apparatus to which my invention relates and shows the relation of the bending roll to a melting tank and a leer. In this drawing, *a* indicates the melting tank, *b* the bending roll,—journaled as at *c*,—and *d* the inlet-end of an annealing leer. *e* indicates the sheet of glass proceeding from the tank.

Heretofore the bending roll has been composed of a variety of substances such, for instance, as iron, steel, burnt clay, and even wood, rendered more or less refractory by its impregnation with other substances. All of these materials, in practice, have surfaces more or less porous and rough and having minute indentations forming matrices which leave their imprint upon the surface of the sheet of glass. Moreover, the glass in passing over the bending rolls heretofore employed, tends,—for some obscure reason,—to develop defective spots known in the glass industry as "burns." To overcome these difficulties I take a compound consisting of about twenty-five per cent., bulk, of graphite, and of plaster of Paris seventy-five per cent., although these proportions may be varied as conditions may require. These substances are ground as nearly as may be to an impalpable powder and are thoroughly mixed. This powder is now applied to the bending roll and is thoroughly rubbed upon and into the cylindrical surface of the roll to form as thick a layer as may be required and until all of the minute pits, interstices and irregularities are filled and until the roll presents a smooth finished surface. This mixture resists the heat of the sheet of glass and takes a highly polished surface free from the objectionable features above referred to.

If the surface thus prepared becomes worn or irregular it may, at suitable intervals, be readily renewed by a fresh application of my compound.

Having described my invention, what I claim and desire to secure by Letters Patent, is—

1. In a device of the described character, a bending roll surfaced with a compound consisting of finely powdered graphite and plaster of Paris in substantially the proportions specified.

2. In a device of the described character, a bending roll having a smooth cylindrical surface-portion which consists of a compound of about twenty-five per cent. graphite and seventy-five per cent. plaster of Paris, both ingredients being finely powdered and thoroughly mixed.

In testimony whereof I affix my signature in presence of two witnesses.

ULYSSES G. BAKER.

Witnesses:
RHODA KNAGGS,
JOHN H. JAMESON.